United States Patent [19]

Christiansen

[11] 4,246,887
[45] Jan. 27, 1981

[54] HEAT RECOVERY AND SOLAR ASSIST HEATING SYSTEM

[76] Inventor: Marion W. Christiansen, Rte. #2, North, Pocatello, Id. 83201

[21] Appl. No.: 869,213

[22] Filed: Jan. 12, 1978

[51] Int. Cl.³ ............................................. F24J 3/02
[52] U.S. Cl. .................................. 126/427; 126/428; 126/429; 126/430; 126/435
[58] Field of Search ................... 237/1 A, 19, 30, 8 R; 165/DIG. 2, DIG. 12, DIG. 4, 107, 66; 122/421, 20 B, DIG. 1, 7 R, 135 R, 155 R, 181 R, 185; 126/271, 270, 400, 427, 428, 429, 430, 436

[56] References Cited

U.S. PATENT DOCUMENTS

| 1,151,676 | 8/1915 | Foersterling | 122/7 R |
|---|---|---|---|
| 2,907,318 | 10/1959 | Awot | 126/271 |
| 3,299,881 | 1/1967 | Koch | 126/271 |
| 3,896,992 | 7/1975 | Borovina et al. | 237/8 R X |
| 3,916,991 | 11/1975 | Trump | 165/DIG. 2 |
| 4,050,626 | 9/1977 | Awalt | 237/1 A |
| 4,059,226 | 11/1977 | Atkinson | 126/400 |
| 4,061,129 | 12/1977 | Wilson | 126/400 |
| 4,084,745 | 4/1978 | Jones | 165/DIG. 2 X |
| 4,158,358 | 6/1979 | Thomason et al. | 126/400 |

Primary Examiner—Albert J. Makay
Assistant Examiner—Henry Bennett
Attorney, Agent, or Firm—Clarence A. O'Brien; Harvey B. Jacobson

[57] ABSTRACT

Heat energy is extracted from the exhaust discharged by heating devices within a house by a roof-mounted recovery unit through which the exhaust is ultimately vented in order to heat air and water circulated through the house. An additional source of heat for transfer to the air and water is derived from solar radiation collected within the recovery unit and by a separate solar heat storing unit connected thereto.

15 Claims, 6 Drawing Figures

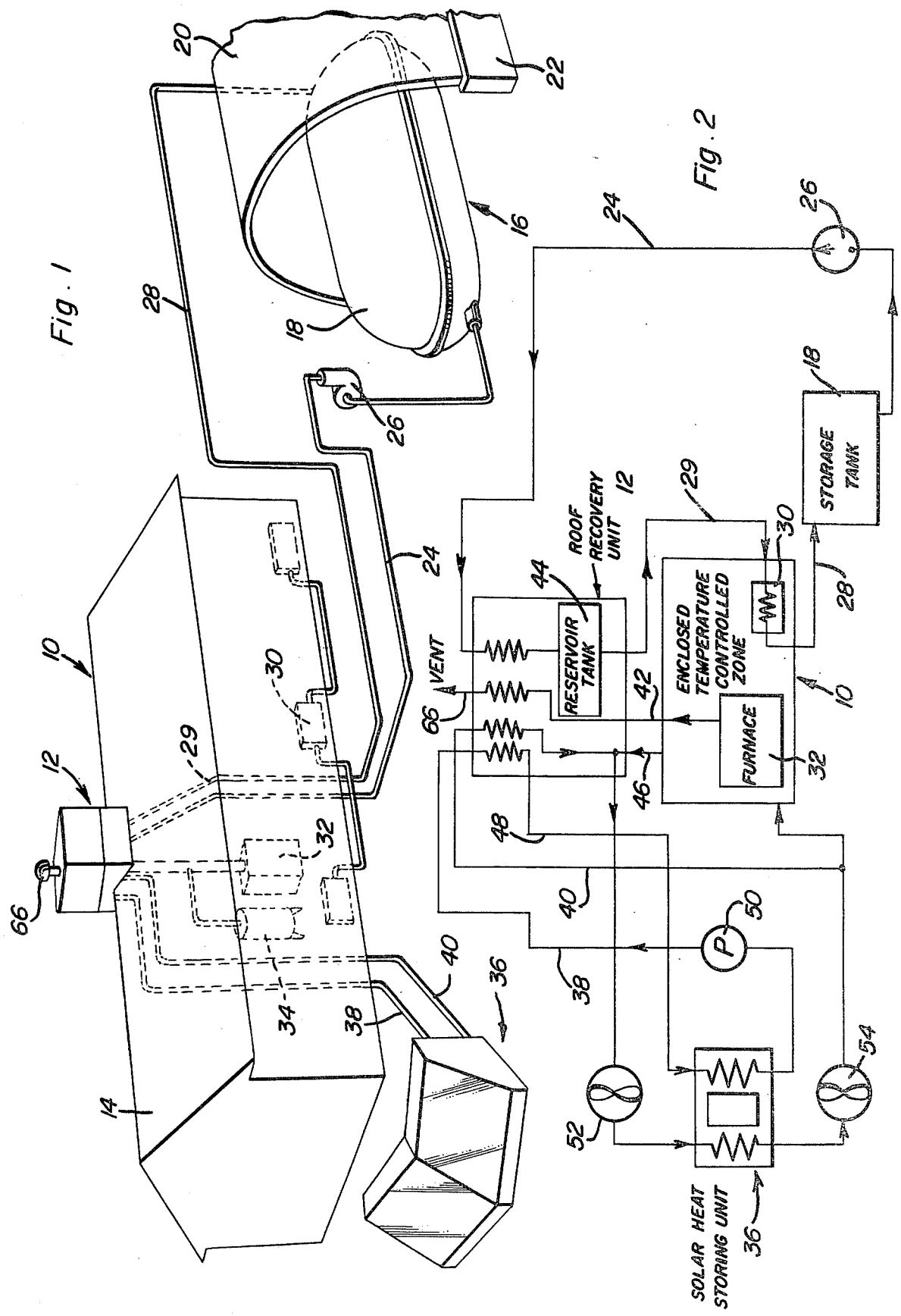

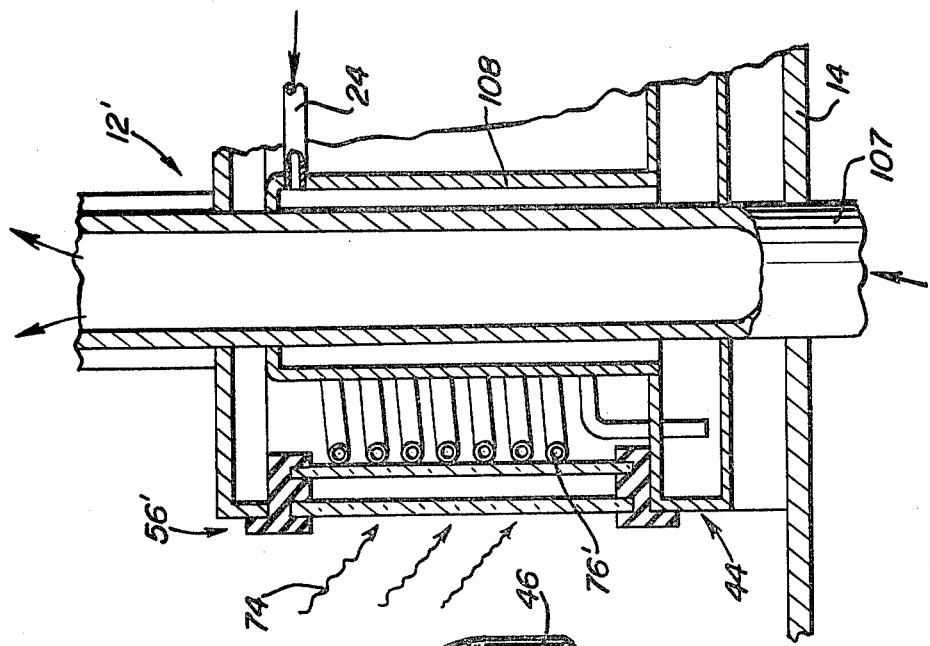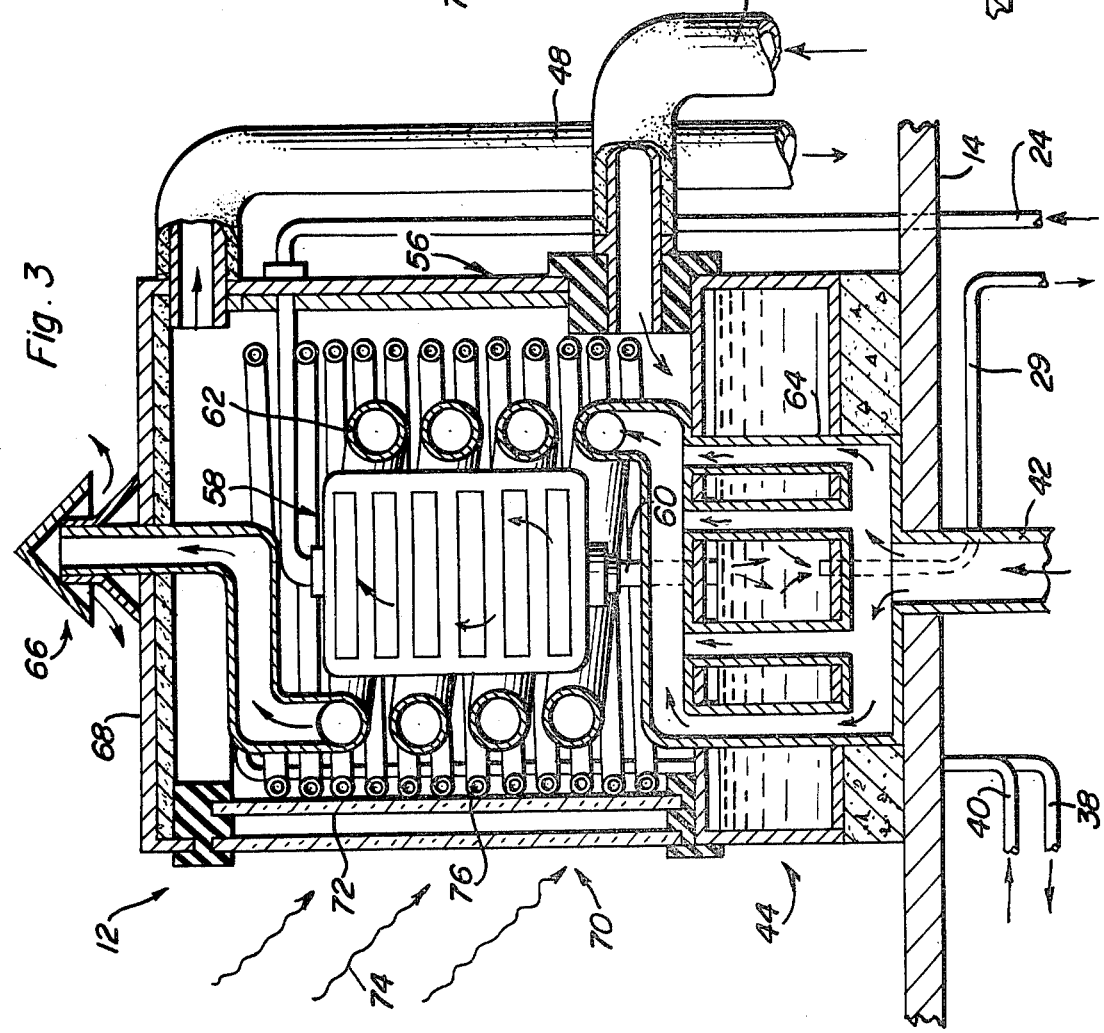

HEAT RECOVERY AND SOLAR ASSIST HEATING SYSTEM

BACKGROUND OF THE INVENTION

This invention relates to energy saving improvements to heating plants for residential homes or the like and more particularly to auxiliary heating facilities arranged to reduce the amount of fuel necessary to produce the desired heating of a given enclosed space.

In an effort to save combustible fuel such as oil, gas, coal and wood presently utilized as a source of heat for heating residential houses, many solar heating systems have been devised to augment and/or replace combustion types of heating devices. Such systems depend entirely on solar radiation as the source of heat and are therefore completely inoperative during night time and periods of cloudy weather. Further, such solar heating systems are not feasible in all geographical locations. It is therefore an important object of the present invention to provide an auxiliary heating system which is compatible with existing heating plants in residential homes to reduce fuel consumption utilizing solar radiation only as a relatively minor and make-up source of heat.

SUMMARY OF THE INVENTION

In accordance with the present invention, the exhaust gas or combustion products from heating devices such as furnaces, hot water heaters and fireplaces within a residential home constitute the major source of heat extracted within a roof-mounted recovery unit to heat water conducted through radiators in the house and the air circulated therethrough. A minor source of heat is derived from solar radiation collected within the heat recovery unit itself by a coolant circulated through tubing internally lining a radiation transmissive wall portion of the recovery unit housing. The coolant may also be heated by solar radiation collected and stored within a separate heat storing unit to which the tubing is connected. Thus, the heat obtained from solar radiation and the exhaust gas will respectively vary inversely relative to each other to provide a total amount that more closely approaches constancy. For example, during periods when less solar radiation is available, more exhaust gas will be present because of the greater heating demands made on the existing heating devices.

The heat recovery unit housing is mounted on a reservoir tank from which heated water is withdrawn to internally heat the house. The cold water is fed to a heat exchanger within the insulated housing through which heat transfer occurs from the exhaust gas. The exhaust gas also heats air circulated through the housing to which additional heat is transferred from solar energy collecting tubing coils internally lining the housing walls through which solar radiation passes. The tubing coils are connected to tubing embedded in heat storing gravel enclosed within the insulated housing of the solar heat storing unit positioned so as to receive solar radiation through a radiation transmissive wall portion. The solar energy is collected within an air space separated from the body of the gravel by a heat conductive plate through which air convection tubes extend from the air space to the gravel. Air circulated through the gravel is also heated and supplied to the house.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a simplified perspective view showing a typical installation of the system of the present invention.

FIG. 2 is a fluid circuit diagram depicting the system illustrated in FIG. 1.

FIG. 3 is a side sectional view of the heat recovery unit shown in FIG. 1.

FIG. 6 is a partial side sectional view through a modified form of heat recovery unit.

DETAILED DESCRIPTION OF PREFERRED EMBODIMENTS

Figure 4:
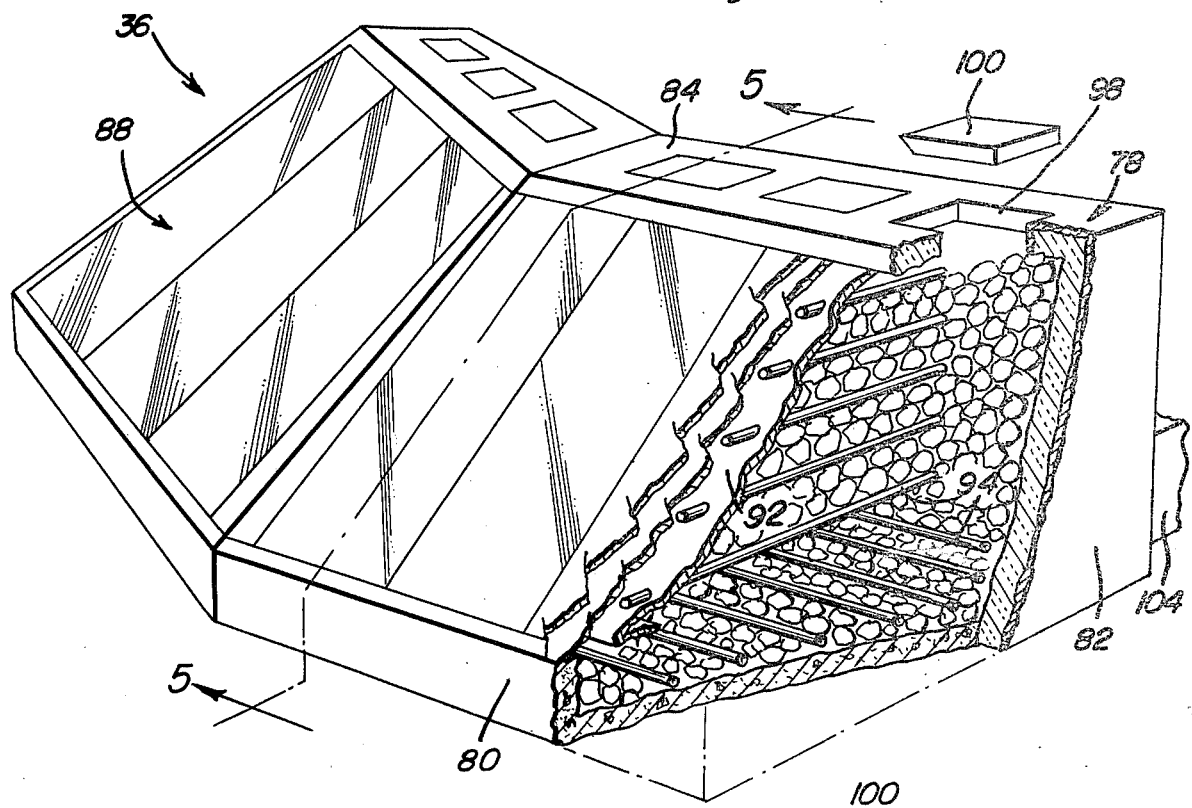
FIG. 4 is a perspective view with parts broken away and shown in section of the solar heat storing unit shown in FIG. 1.

Referring now to the drawings in detail, FIG. 1 illustrates a typical installation for the system of the present invention associated with a residential house 10 enclosing a temperature controlled zone. A heat recovery unit 12 associated with the system is mounted on the roof 14 of the house externally of the enclosed zone and is operatively connected to a source 16 of fluent heating medium such as water adapted to be buried underground adjacent to the house. In the embodiment illustrated, the source 16 consists of a plastic water storage tank 18 enclosed by a greenhouse insulation shield 20 positioned on concrete blocks 22 to protect the tank from moisture and loss of heat during cold weather. Plastic supply piping 24 having a pump 26 in the line, conducts cold water from the tank 18 to the heat recovery unit 12 from which the water is returned through plastic return piping 28 to the tank. The water heated within the roof-mounted unit 12 is circulated by pipe 29 through auxiliary radiators 30 within the house for controlling the temperature therein. One source of heat energy for the heat recovery unit 12 is exhaust gas such as the combustion products discharged from a furnace 32 and other heating devices such as gas-fired, hot water heaters 34. The heat recovery unit 12 is operative to extract heat energy from the exhaust gas which is otherwise lost upon venting of the exhaust to atmosphere through a chimney flue.

During periods when the heat output of the heating devices 32 and 34 may be low and the amount of heat recoverable from exhaust gas is minimal, a source of additional heat may then be available to a variable degree as makeup from solar radiation directly absorbed by the heat recovery unit 12 itself and from a separate heat storing unit 36. The unit 36 is also mounted exteriorly of the house at a suitable location and is connected to the heat recovery unit 12 for transfer of heat thereto by means of a coolant such as an antifreeze solution, in conduits 38 and 40 interconnecting the units 12 and 36.

FIG. 2 schematically depicts the system corresponding to the installation illustrated in FIG. 1. As more clearly seen in FIG. 2, the exhaust gas is conducted by a heat transfer conduit 42 through unit 12 in heat transfer relation to the water conducted thereto through piping 24 to a water reservoir tank 44 from which heated water is circulated through the radiators 30. The exhaust gas also passes in heat transfer relation to air conducted to and from unit 12 by ducts 46 and 48. Additional heat may be acquired by the air, to avoid loss thereto from the exhaust gas, from solar radiation. Toward that end, the coolant in conduits 38 and 40 is circulated through the unit 12 by pump 50. The coolant in conduit 40 is heated in unit 36 within which solar energy is collected and stored to not only heat the coolant but also the air circulated by the blowers 52 and 54 through both units 12 and 36 and the house 10.

As more clearly seen in FIG. 3, the heat recovery unit 12 includes an internally insulated housing 56 through which air is circulated by the air ducts 46 and 48 within a heat exchange zone located above the reservoir tank 44 on which the housing 56 is mounted in spaced relation above the roof 14. The air passes in heat conductive relation to a heat exchanger unit 58 to which the cold water supply pipe 24 is connected. The water heated in the heat exchanger unit 58 is then conducted by outlet 60 into the reservoir tank 44 within which a relatively large body of heated water is stored for supply to the radiators 30 through pipe 29.

The major source of heat for both the air in the heat exchange zone enclosed by housing 56 and the heat exchanger 58 is the exhaust gas conducted by coiled duct 62 positioned in close surrounding relation to the heat exchanger 58. The duct 62 is connected at the lower end to heat transfer tubes 64 passing through the reservoir tank 44 and connected to the exhaust gas conduit 42. Thus, the heat in the exhaust gas is sequentially transferred to the water in tank 44 and to the heat exchange zone thereabove before it is discharged to atmosphere through a vent 66 mounted on an insulated cover 68 closing the top of housing 56.

A portion 70 of the housing wall transmits solar radiation and may be made, for example, of a plurality of spaced sheets of glass 72. The unit 12 is accordingly orientated on the roof 14 so as to receive the maximum amount of solar radiation 74 through the transmissive wall portion 70 as depicted in FIG. 3. Coiled tubing 76 internally lines the housing 56 so as to contact the inner sheet of glass 72 and thereby collect solar heat energy within the coolant circulated therethrough for transfer of such heat to the air within the heat exchange zone. Additional heat may be transferred to the heat exchange zone by the coolant from the solar heat storing unit 36 as aforementioned to which the tubing 76 is connected by tubing 38 and 40.

Figure 5:
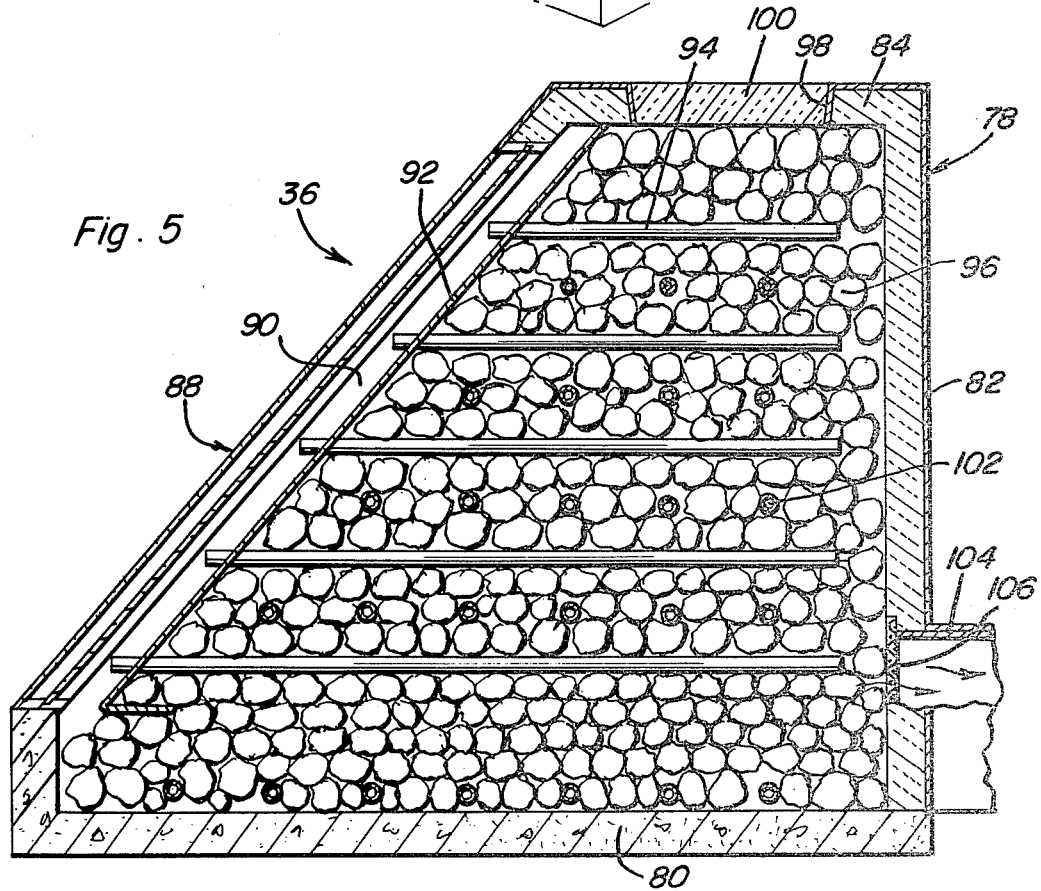
FIG. 5 is a sectional view taken substantially through a plane indicated by section line 5—5 in FIG. 4.

As more clearly seen in FIGS. 4 and 5, the solar heat storing unit 36 includes an insulated housing 78 formed by a concrete base 80, opaque back and top walls 82 and 84 and an inclined, radiation transmissive front wall 88. Solar radiation entering the front wall will heat an air space 90 formed adjacent thereto in front of a heat conductive plate 92 from which convection tubes 94 extend rearwardly. The tubes 94 are spaced from each other and from the insulating walls of the housing 78 as shown, for distribution throughout a heat storing chamber enclosed by the housing and within which tubes 94 are embedded in a body of particulate heat storing medium such as washed gravel 96. The gravel is adapted to be loaded into the housing 78 through openings 98 in the top wall 84, closed by insulating covers 100. Also embedded in the gravel 96 is heat transfer tubing 102 connected to the tubing 38 and 40. The heat energy collected in space 90 is transferred by conduction through plate 92 and by convection through tubes 94 to the gravel 96 within which it is stored. The heat so stored is transferred to the coolant in tubing 102 whereby hot coolant is supplied through tube 40 to unit 12 and colder coolant returned by tube 38 to the unit 36.

Air is circulated by the blowers aforementioned through the gravel 96 to also augment heating of the air by the heat recovery unit 12. Spaced air ducts 104 are therefore connected to the back and side walls of the housing 78 adjacent the base 80. Screening 106 prevents outflow of gravel with the air into the duct.

FIG. 6 illustrates a modified form of heat recovery unit 12' suitable for use with a fireplace type of heating device from which a chimney flue 107 extends upwardly through the roof 14. The flue conducts combustion products from the fireplace sequentially through the body of water within a reservoir tank 44' and the heat exchange zone within housing 56' which is similar in construction to housing 56 hereinbefore described. The housing 56' is also internally lined by coiled tubing 76' through which coolant may be conducted for collecting heat energy from solar radiation 74 to heat the air within the heat exchange zone. The coolant in tubing 76' may be the same fluent medium stored in tank 44' or may be water preheated in the heat recovery unit before circulation through a hot water heater 34 shown in FIG. 1 to save fuel consumption. The water in tank 44' is heated by the exhaust gas conducted by flue 107 through jacket 108 within the heat exchange zone. The water jacket will also contribute to the heating of the air in the heat exchange zone, and receives its supply of water from tubing 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. The combination with a heating device for an enclosed zone, from which exhaust gas is discharged at an elevated temperature, and a source of fluent heat transfer medium, a heat recovery unit mounted exteriorly of the enclosed zone for heating the fluent medium, comprising a reservoir tank enclosing a body of said fluent medium, an insulated housing mounted on said reservoir tank enclosing a heat exchange zone and having a radiation transmissive wall portion through which solar radiation passes, heat transfer conduit means extending through the reservoir tank and the housing for conducting the exhaust gas in sequence through said body of fluent medium and the heat exchange zone, and heat exchanger means mounted within the heat exchange zone for conducting the fluent medium between the source of the reservoir tank in heat transfer relation to the exhaust gas in the heat transfer conduit means and the air within the heat exchange zone.

2. The combination of claim 1 including heat radiating means within said enclosed zone through which the fluent medium is circulated for controlling the temperature within the enclosed zone, and solar energy collecting means mounted externally of the enclosed zone and connected to the heat recovery means for maintaining a predetermined transfer of heat energy to the fluent medium.

3. The combination of claim 2 including blower means for circulating air between the heat recovery means and the enclosed zone.

4. The combination of claim 3 including means for circulating coolant through the heat recovery means and the solar energy collecting means to transfer solar heat energy to the air circulated through the heat recovery means.

5. The combination of claim 3 wherein said solar energy collecting means includes heat transfer tubing mounted on said transmissive wall portion of the housing through which the coolant is conducted in heat exchange relation to the air within the heat exchange zone.

6. The combination of claim 5 wherein said solar energy collecting means further includes an auxiliary solar heat storing device through which the air and coolant are circulated by the blower means and the coolant circulating means, respectively.

7. The combination of claim 6 wherein said solar heat storing device includes a separate insulated housing having a radiation transmissive wall portion, a body of particulate heat storing medium enclosed within said separate housing, a heat conductive plate spacing the heat storing medium from the radiation transmissive wall portion to form a heat collecting air space in contact with the wall portion, and convection tubes extending through the plate between the heat collecting air space and the body of heat storing medium, said blower means being connected to the separate housing for circulating the air through the body of heat storing medium.

8. The combination of claim 7 wherein said coolant circulating means extends through the body of heat storing medium.

9. The combination of claim 5 wherein said coolant is the same composition as the fluent medium in the reservoir tank.

10. The combination of claim 9 wherein said heat transfer conduit means is a chimney flue and said heat exchanger means is a jacket enclosing the flue within the heat exchange zone, the fluent medium being circulated through the jacket in heat conductive relation to the flue.

11. The combination of claim 2 wherein said solar energy collecting means includes heat transfer tubing mounted on said transmissive wall portion.

12. In combination with a heating device for an enclosed zone from which exhaust gas is discharged at an elevated temperature, a source of fluent heat transfer medium, heat radiating means within said enclosed zone through which the fluent medium is circulated for controlling the temperature within the enclosed zone, heat recovery means mounted externally of the enclosed zone through which the fluent medium is conducted in heat transfer relation to the exhaust gas for heating the fluent medium, solar energy collecting means mounted externally of the enclosed zone and connected to the heat recovery means for maintaining a predetermined transfer of heat energy to the fluent medium, blower means for circulating air between the heat recovery means and the enclosed zone, and means for circulating coolant through the heat recovery means and the solar energy collecting means to transfer solar heat energy to the air circulated through the heat recovery means, said solar energy collecting means including an insulated housing having a radiation transmissive wall portion, a body of particulate heat storing medium enclosed within said housing, a heat conductive plate spacing the heat storing medium from the radiation transmissive wall portion to form a heat collecting air space in contact with the wall portion, and convection tubes extending through the plate between the heat collecting air space and the body of heat storing medium, said blower means being connected to the housing for circulating the air through the body of heat storing medium.

13. The combination of claim 12 wherein said coolant circulating means extends through the body of heat storing medium.

14. In combination with a heating device for an enclosed zone from which exhaust gas is vented and a heat recovery unit through which heat from the exhaust gas is extracted to heat a fluent medium circulated through the enclosed zone, an auxiliary heat storing unit for augmenting the heat energy supply to the fluent medium by the heat recovery unit, comprising a insulated housing having a radiation transmissive wall portion, a body of particulate heat storing medium enclosed within said housing, a heat conductive plate spacing the heat storing medium from the radiation transmissive wall portion to form a heat collecting air space in contact with the wall portion, convection tubes extending through the plate between the heat collecting air space and the body of heat storing medium, and coil means embedded in the heat storing medium and connected to the heat recovery unit for transferring heat energy thereto.

15. A waste heat recovery apparatus, comprising an exhaust conduit through which combustion products are conducted, a reservoir enclosing a body of heat transfer medium, an insulated housing enclosing a heat exchange zone, means connected to said exhaust conduit for conducting the combustion products in sequence through said reservoir and the heat exchange zone, heat exchanger means mounted within the heat exchange zone for conducting the heat transfer medium to the reservoir in heat exchange relation to the combustion products and air within the heat exchange zone, and means recirculating said heat transfer medium between the reservoir and the heat exchanger means externally of the housing for delivering heat energy recovered from the combustion products, said housing including a radiation transmissive wall portion through which solar radiation passes to heat the air within the heat exchange zone.

* * * * *

UNITED STATES PATENT AND TRADEMARK OFFICE
CERTIFICATE OF CORRECTION

PATENT NO. : 4,246,887
DATED : January 27, 1981
INVENTOR(S) : MARION W. CHRISTENSEN It is certified that error appears in the above-identified patent and that said Letters Patent are hereby corrected as shown below:

On the title page, in the inventor's name, delete "Christiansen" and substitute --Christensen--.

Signed and Sealed this

Twenty-eighth Day of April 1981

[SEAL]

Attest:

RENE D. TEGTMEYER

*Attesting Officer*   *Acting Commissioner of Patents and Trademarks*